US010321035B2

(12) United States Patent
Sakaguchi

(10) Patent No.: US 10,321,035 B2
(45) Date of Patent: *Jun. 11, 2019

(54) CAMERA AND OPTICAL APPARATUS

(71) Applicant: Sony Corporation, Tokyo (JP)

(72) Inventor: Yuuki Sakaguchi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/662,121

(22) Filed: Jul. 27, 2017

(65) Prior Publication Data

US 2018/0013940 A1    Jan. 11, 2018

Related U.S. Application Data

(63) Continuation of application No. 15/160,385, filed on May 20, 2016, now Pat. No. 9,749,512, which is a continuation of application No. 14/735,436, filed on Jun. 10, 2015, now Pat. No. 9,392,150, which is a continuation of application No. 13/901,755, filed on May 24, 2013, now Pat. No. 9,131,134.

(51) Int. Cl.
     *H04N 5/225*      (2006.01)
     *H04N 5/335*      (2011.01)

(52) U.S. Cl.
     CPC ......... *H04N 5/2254* (2013.01); *H04N 5/2252* (2013.01); *H04N 5/2253* (2013.01); *H04N 5/335* (2013.01)

(58) Field of Classification Search
     CPC .. H04N 5/2254; H04N 5/2252; H04N 5/2253; H04N 5/335; G03B 17/563; G03B 17/02; G02B 5/122; G02B 5/124; G02B 5/128
     See application file for complete search history.

(56) References Cited

U.S. PATENT DOCUMENTS

| | | | |
|---|---|---|---|
| 5,041,858 A | 8/1991 | Yamamichi et al. | |
| 5,359,379 A | 10/1994 | Kohno et al. | |
| 5,757,427 A | 5/1998 | Miyaguchi | |
| 6,704,053 B1 | 3/2004 | Niikawa et al. | |
| 6,910,814 B2 | 6/2005 | Kawai et al. | |
| 8,421,912 B2 | 4/2013 | Tobinaga et al. | |
| 9,131,134 B2 | 9/2015 | Sakaguchi | |
| 9,749,512 B2 * | 8/2017 | Sakaguchi | H04N 5/2254 |
| 2005/0025472 A1 * | 2/2005 | Sugita | G03B 17/14 |
| | | | 396/71 |
| 2007/0077063 A1 * | 4/2007 | Tokiwa | G03B 17/14 |
| | | | 396/532 |

(Continued)

FOREIGN PATENT DOCUMENTS

JP      2007-279716 A      10/2007
WO      WO-2010/029731 A1      3/2010

*Primary Examiner* — Luong T Nguyen
(74) *Attorney, Agent, or Firm* — Michael Best & Friedrich LLP

(57) ABSTRACT

A camera includes: a ring-like body mount having an inside diameter smaller than about 48 millimeters; and a solid-state image pickup device arranged oppositely to the body mount, the solid-state image pickup device having a rectangle light receiving section with a diagonal line length of about 43 millimeters or more. An apparent shape of the solid-state image pickup device viewed from a front surface side of the body mount is a rectangle in which one or more corners are oblique.

23 Claims, 15 Drawing Sheets

(56) References Cited

U.S. PATENT DOCUMENTS

| | | | |
|---|---|---|---|
| 2007/0217785 A1* | 9/2007 | Fujiwara | G03B 17/14 396/529 |
| 2010/0066892 A1 | 3/2010 | Momoki | |
| 2011/0103789 A1* | 5/2011 | Honjo | G02B 7/102 396/530 |
| 2011/0164171 A1 | 7/2011 | Yasuda et al. | |
| 2012/0314119 A1 | 12/2012 | Tobinaga et al. | |
| 2013/0107115 A1* | 5/2013 | Tobinaga | H04N 5/2253 348/374 |

* cited by examiner

CAMERA AND OPTICAL APPARATUS

CROSS REFERENCES TO RELATED APPLICATIONS

This application is a Continuation application of application Ser. No. 15/160,385 filed on May 20, 2016 which is a Continuation application of U.S. patent application Ser. No. 14/735,436 filed on Jun. 10, 2015, which issued as U.S. Pat. No. 9,392,150 on Jul. 12, 2016 and is a Continuation application of U.S. patent application Ser. No. 13/901,755 filed on May 24, 2013, which issued as U.S. Pat. No. 9,131,134 on Sep. 8, 2015 the contents of which are hereby incorporated by reference in their entirety.

BACKGROUND

The present disclosure relates to a camera with interchangeable lenses and to an optical apparatus including the same.

Until now, as a comparatively small-sized camera in which the inside diameter of the body mount is smaller than 48 mm, a camera mounted with a solid-state image pickup device having a size equal to or smaller than APS-C size (screen size: about 23.4 mm×about 16.7 mm) has been the mainstream.

SUMMARY

In recent years, in the foregoing small-sized camera, more impressive and advanced expressiveness, in which a subject is sharpened with a blurry background has been pursued as in a camera using 35 mm film (screen size: about 36 mm×about 24 mm).

It is desirable to provide a small-sized camera capable of providing high image quality and an optical apparatus including the same.

According to an embodiment of the present disclosure, there is provided a camera including: a ring-like body mount having an inside diameter smaller than about 48 millimeters; and a solid-state image pickup device arranged oppositely to the body mount, the solid-state image pickup device having a rectangle light receiving section with a diagonal line length of about 43 millimeters or more, wherein an apparent shape of the solid-state image pickup device viewed from a front surface side of the body mount is a rectangle in which one or more corners are oblique.

The wording "oblique" includes not only a case in which a diagonal straight line crosses a corner of the rectangle, but also a case in which an arc crosses a corner of the rectangle.

According to an embodiment of the present disclosure, there is provided an optical apparatus provided with a camera and a lens joined interchangeably to the camera, the camera including: a ring-like body mount having an inside diameter smaller than about 48 millimeters; and a solid-state image pickup device arranged oppositely to the body mount, the solid-state image pickup device having a rectangle light receiving section with a diagonal line length of about 43 millimeters or more, wherein an apparent shape of the solid-state image pickup device viewed from a front surface side of the body mount is a rectangle in which one or more corners are oblique.

In the camera according to the embodiment of the present disclosure and the optical apparatus according to the embodiment of the present disclosure, the solid-state image pickup device having the rectangle light receiving section with a diagonal line length of about 43 millimeters or more is mounted on the body mount having an inside diameter smaller than about 48 millimeters. Therefore, an advantage due to increasing the size of the solid-state image pickup device is obtainable. Specifically, the depth of field becomes smaller, and therefore, a subject is shot sharply while background becomes easily blurry.

According to the camera and the optical apparatus according to the embodiments of the present disclosure, the large-sized solid-state image pickup device having the rectangle light receiving section with a diagonal line length of about 43 millimeters or more is mounted on the body mount having an inside diameter smaller than about 48 millimeters, and the apparent shape of the solid-state image pickup device viewed from the front surface side of the body mount is a rectangle in which one or more corners are oblique. Therefore, even if the size is small, high image quality is obtainable.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Preferred embodiments of the present disclosure will be described below in detail with reference to the drawings. The description will be given in the following order.
1. First Embodiment (a case in which a solid-state image pickup device having a diagonal line length of a light receiving section equal to or more than 43 mm is mounted on a body mount having an inside diameter smaller than 48 mm, and an apparent shape of the solid-state image pickup device viewed from the front surface side of the body mount is a rectangle having oblique four corners)
2. Second Embodiment (a case in which an internal wall surface of a contact pin holder is tilted)

1. First Embodiment

Figure 1:
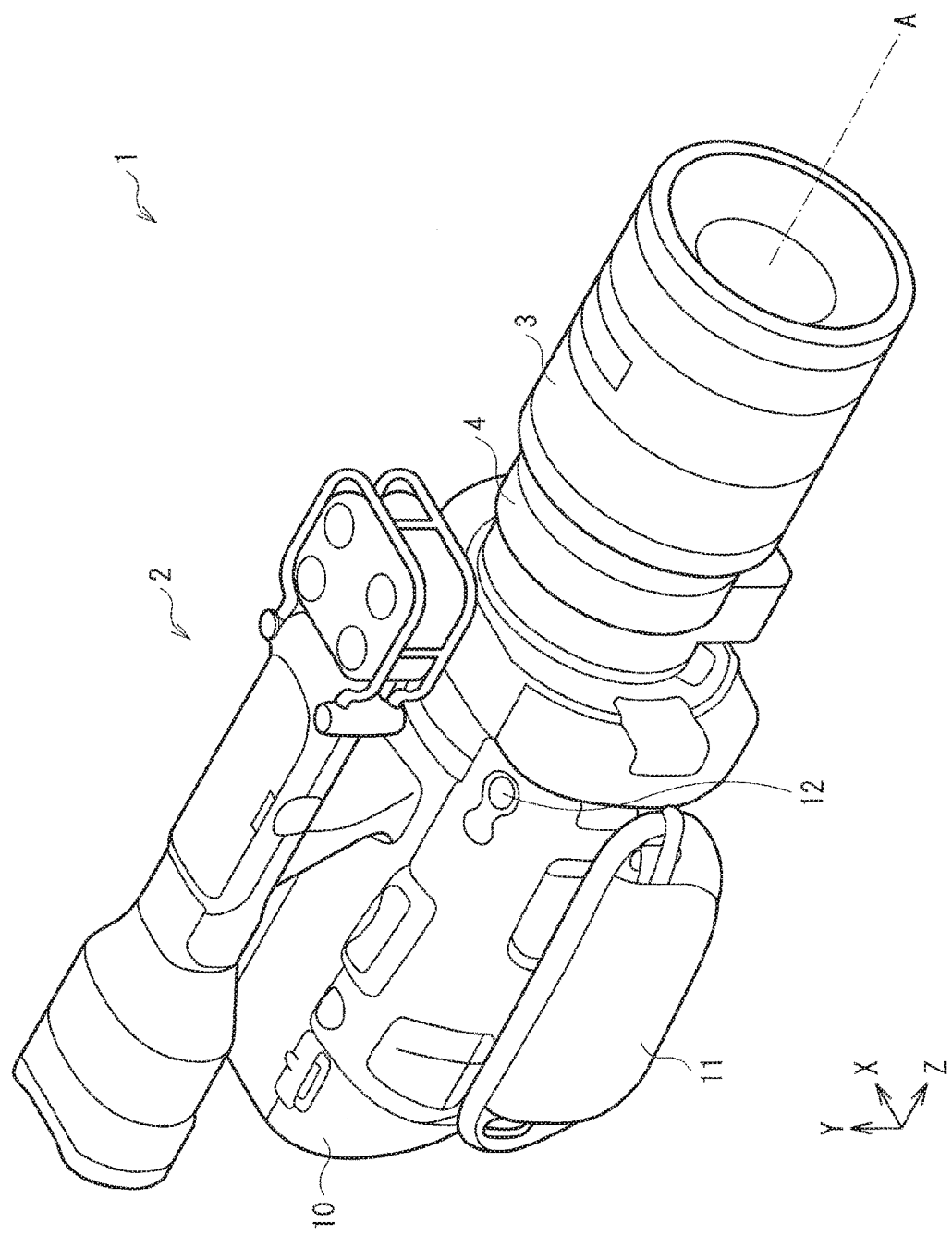
FIG. 1 is a perspective view illustrating an appearance of an optical apparatus according to a first embodiment of the present disclosure, which is viewed from diagonally forward left.

FIG. 1 illustrates an appearance of an optical apparatus (a video camcorder with interchangeable lenses) according to a first embodiment of the present disclosure, which is viewed from diagonally forward left. An optical apparatus 1 may have, for example, a configuration in which a lens 3 is interchangeably joined to the forward front surface of a camera 2. The camera 2 and the lens 3 may be joined through an adapter 4 as necessary.

In this specification, a light axis direction (front-back direction of the camera) is indicated by Z direction, a lateral direction (right-left direction) of the camera is indicated by X direction, and a vertical direction (up-down direction) of the camera is indicated by Y direction. The forward side refers to the subject side in a direction of a light axis A of the lens 3, and the backward side refers to the camera 2 side. Right and left are expressed as directions viewed from the forward side (lens 3 side).

The camera 2 has a main body 10 joined to the lens 3. A grip belt 11 is attached to the left side surface of the main body 10. On the upper left side surface of the main body 10, a start-stop button 12 located on the superior part of a grip is provided.

Figure 2:
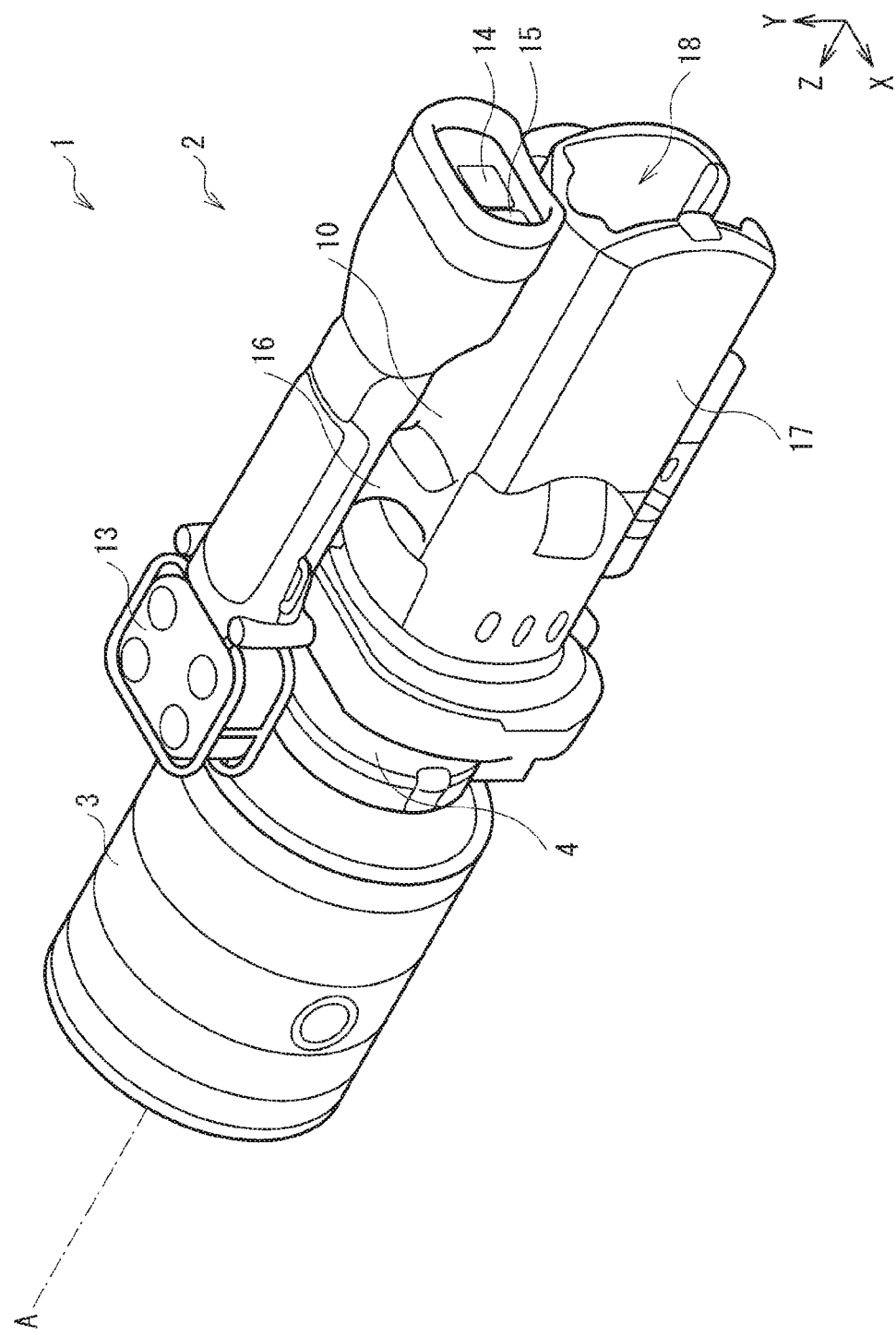
FIG. 2 is a perspective view illustrating an appearance of the optical apparatus illustrated in FIG. 1 viewed from diagonally backward right.
Figure 3:
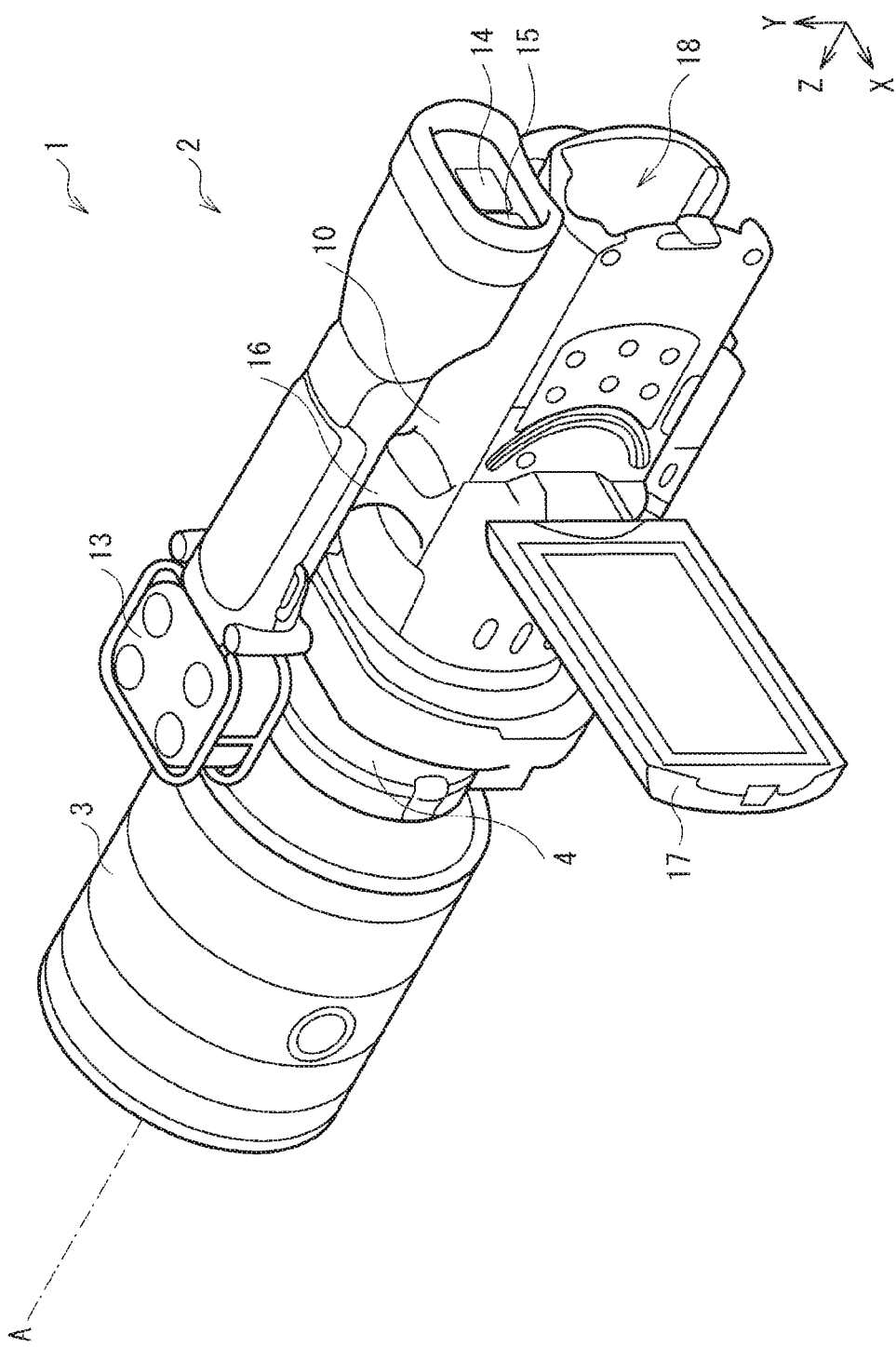
FIG. 3 is a perspective view illustrating a state that a monitor illustrated in FIG. 2 is opened.

FIG. 2 illustrates an appearance of the optical apparatus 1 viewed from diagonally backward right. A microphone 13 is provided on the forward top surface of the main body 10, and a finder 14 and an eye sensor 15 are provided on the backward top surface of the main body 10. The microphone 13, the finder 14, and the eye sensor 15 are attached to the main body 10 in a state of being floated over the top surface of the main body 10 with a neck section 16 in between. A monitor 17 is provided on the backward right side surface of the main body 10. The monitor 17 may be configured of, for example, a liquid crystal panel and a touch panel, and is openable and closable as illustrated in FIG. 3. On the backward end of the main body 10, a battery attaching section 18 is provided, and further, an electric power switch, a start-stop button, a mode button, and the like (not illustrated) are arranged.

Figure 4:
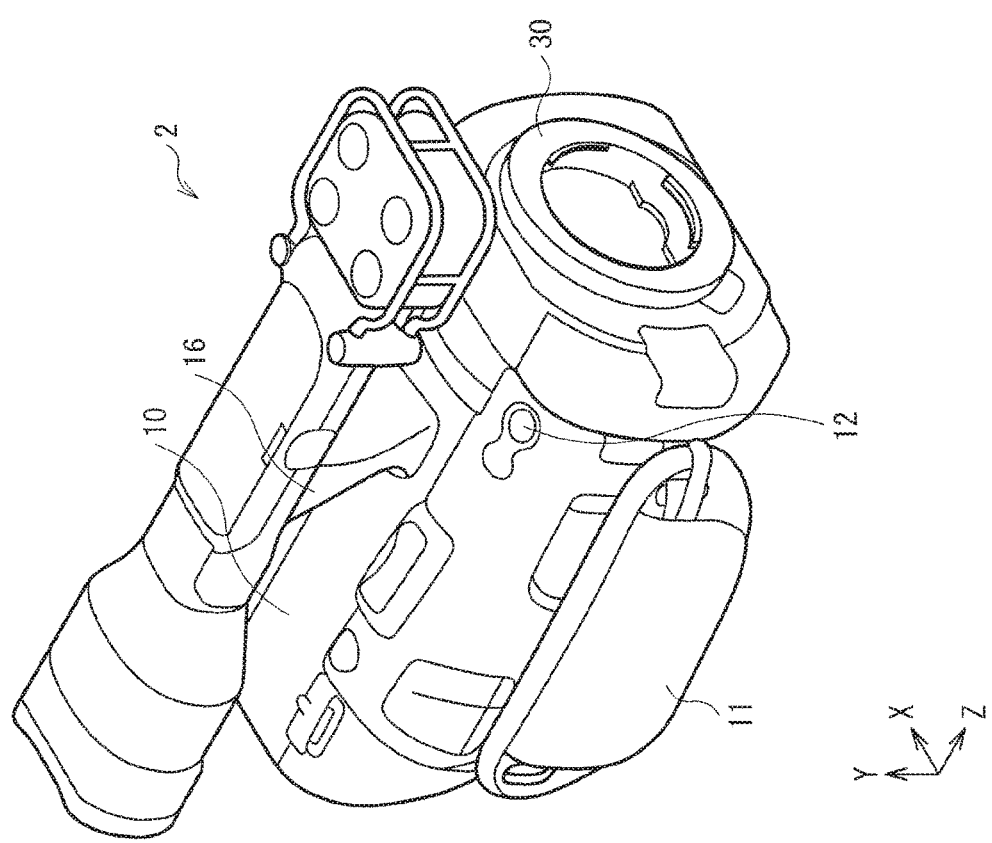
FIG. 4 is a perspective view illustrating an appearance of a camera according to the first embodiment of the present disclosure after a lens and an adapter illustrated in FIG. 1 are detached, which is viewed from diagonally forward left.

FIG. 4 illustrates an appearance of the camera 2 after the lens 3 and the adapter 4 are detached, which is viewed from diagonally forward left. A body mount 30 as a mechanism of junction between the camera 2 and the lens 3 is provided on the forward front surface of the main body 10.

Figure 5:
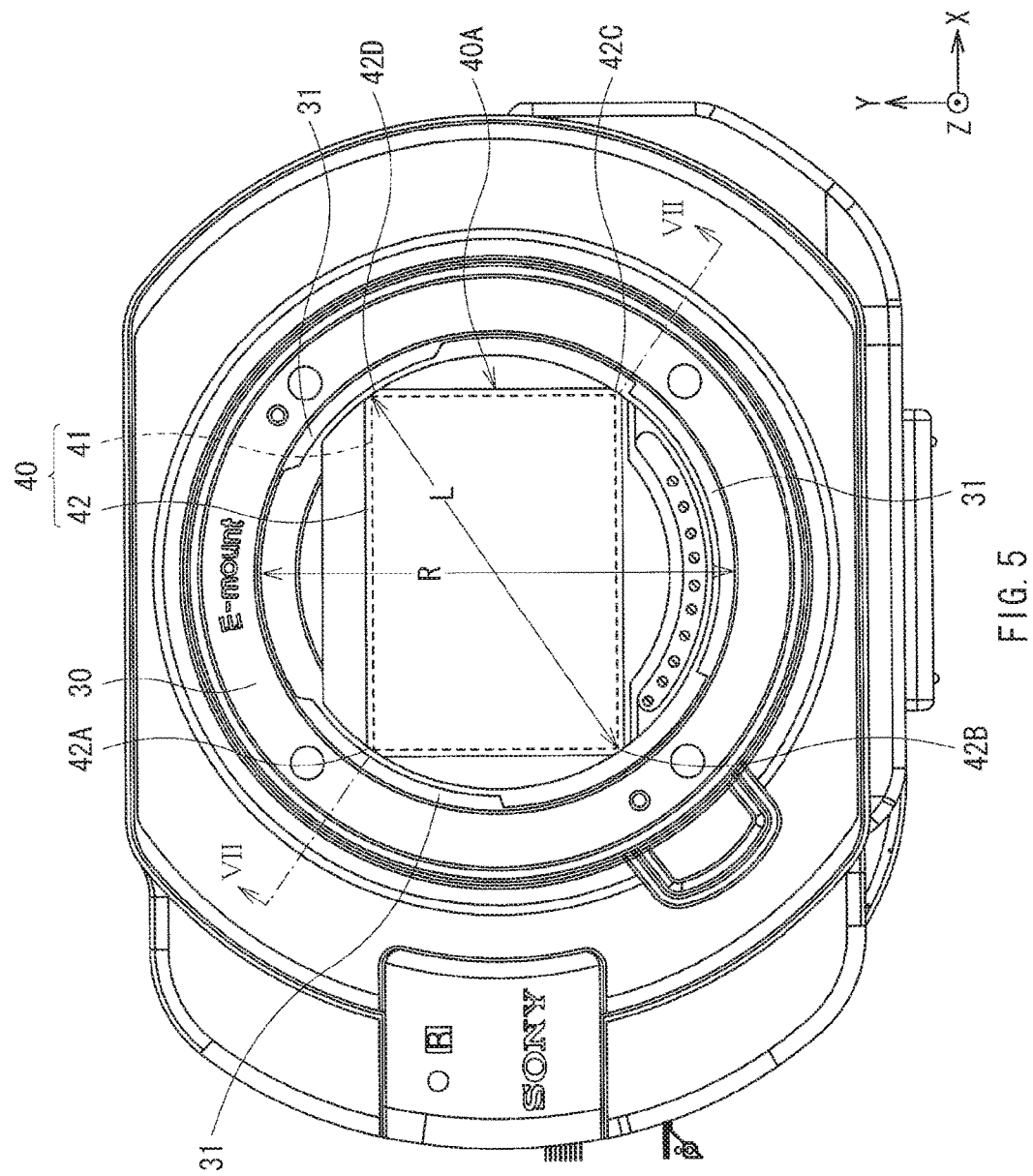
FIG. 5 is an elevation view of a body mount illustrated in FIG. 4 viewed from the forward side.

FIG. 5 illustrates a configuration of the body mount 30 viewed from the forward side. Behind the body mount 30, a solid-state image pickup device 40 is arranged oppositely to the body mount 30.

The body mount 30 may be a ring-like member made of, for example, a metal. An inside diameter (the inside diameter of the body mount) R is smaller than 48 mm, and is specifically 47 mm.

In the inner circumference of the body mount 30, arc-like latches 31 is projected. The number of the latches 31 is plural, and the latches 31 are arranged in a plurality of locations (such as three locations as in FIG. 5) in a circumferential direction of the body mount 30. The latches 31 are used for attaching the lens 3 to the body mount 30 in a manner of bayonet. Specifically, an unillustrated lens mount is provided on the rear end of the lens 3. The lens mount is a ring-like member made of a metal as the body mount 30 is. The inside diameter thereof (the inside diameter of the lens mount) is smaller than that of the body mount 30, and may be, for example, about 40 mm. In the inner circumference of the lens mount, arc-like latches are projected in a plurality of locations in a circumferential direction of the lens mount as in the body mount 30. Inserting the latches of the lens mount between the latches 31 of the body mount 30 and directly rotating the lens 3 allow the lens 3 to be attached to the camera 2. It is to be noted that the body mount 30 and the latches 31 may be integrally formed, or may be configured of separate members.

The solid-state image pickup device 40 is used to pick up a subject image formed by an optical system (not illustrated) of the lens 3, and is a full-frame image pickup device configured of a CCD (Charge Coupled Device), a CMOS (Complementary Metal Oxide Semiconductor) image sensor, or the like. The solid-state image pickup device 40 may have, for example, a peripheral region 42 including a peripheral circuit (not illustrated) and the like around a rectangle light receiving section 41.

The light receiving section 41 may be preferably a rectangle section having a long side of 36 mm and a short side of 24 mm (diagonal line length L: about 43.267 mm), that is, a so-called 35 mm full-sized section. One reason for this is that, in this case, the area of the light receiving section 41 is wide, the amount of light received per one pixel becomes large, and accordingly, a light photograph is allowed to be shot. Another reason for this is that, in this case, even in a dark place, photographing is allowed at a high shutter speed, and camera shake is allowed to be suppressed. Still another reason for this is that, in this case, as the size of the light receiving section 41 is wider, the depth of field becomes smaller, and therefore, a subject is allowed to be sharpened with an appropriately-blurry background, and more impressive and advanced expressiveness is obtainable.

In the first embodiment, as described above, while the inside diameter R of the body mount 30 is smaller than 48 mm, the solid-state image pickup device 40 has the rectangle light receiving section 41 having the diagonal line length L of 43 mm or more. An apparent shape 40A of the solid-state image pickup device 40 viewed from the front surface side of the body mount 30 is a rectangle in which at least one corner 42A is oblique. Therefore, in the camera 2, even if the size is small, high image quality is obtainable.

Specifically, as illustrated in FIG. 5, the apparent shape 40A of the solid-state image pickup device 40 viewed from the front surface side of the body mount 30 is a rectangle in which four corners 42A, 42B, 42C, and 42D are oblique.

Figure 6:
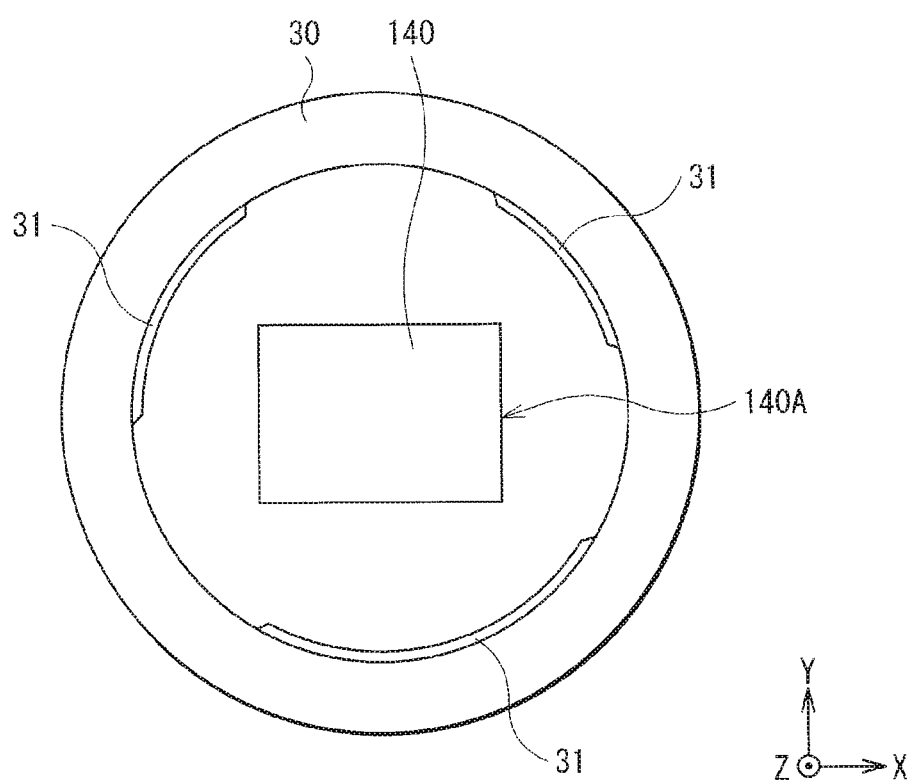
FIG. 6 is an elevation view illustrating a state that an APS-C-sized solid-state image pickup device is mounted on the body mount illustrated in FIG. 5.

It is to be noted that, in the case where an APS-C-sized solid-state image pickup device 140 is loaded onto the body mount 30, as illustrated in FIG. 6, an apparent shape 140A of the solid-state image pickup device 140 viewed from the front surface side of the body mount 30 is a rectangle. In other words, the apparent shape 140A of the solid-state image pickup device 140 is a rectangle similar to the original outer shape of the solid-state image pickup device 140.

Figure 7:
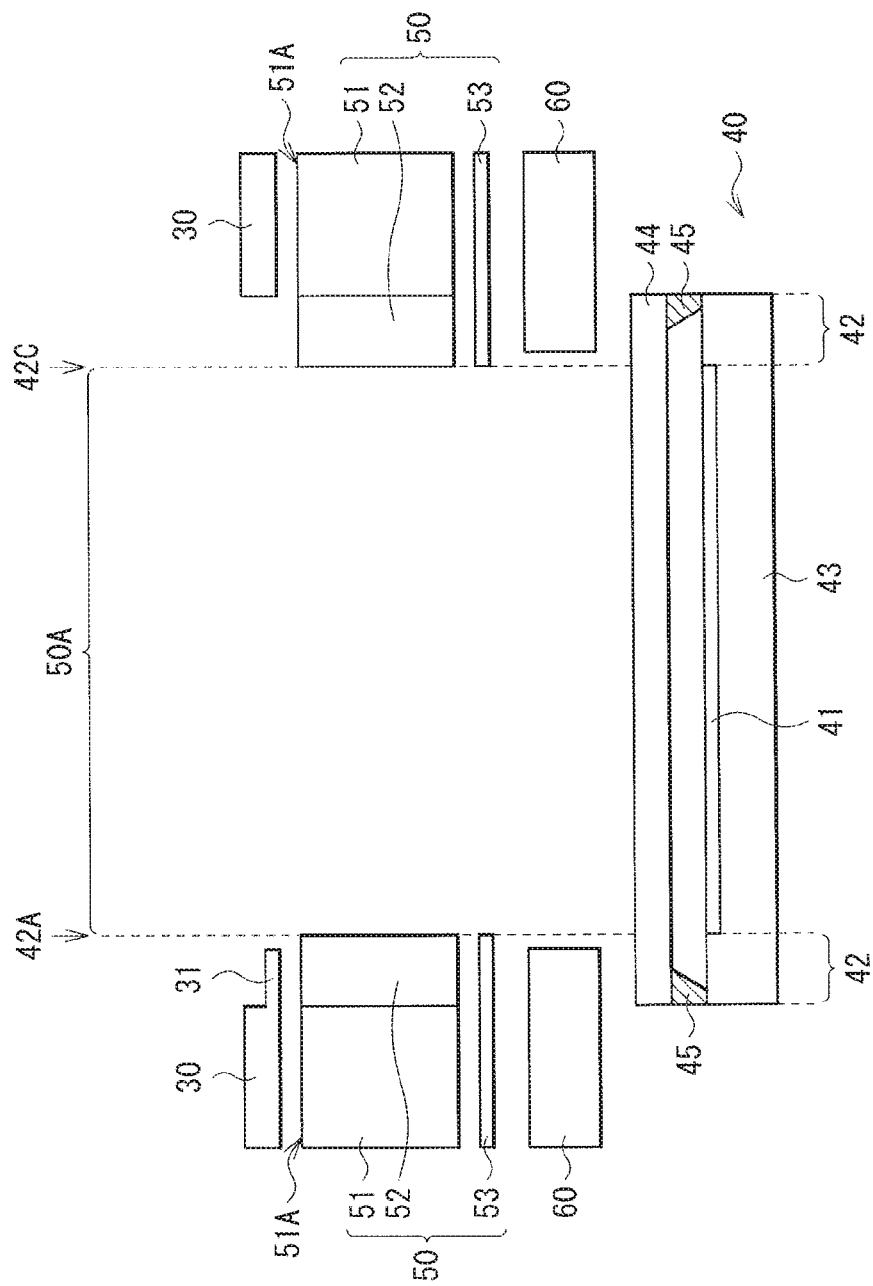
FIG. 7 is a schematic cross-sectional view taken along a line VII-VII of FIG. 5.

FIG. 7 schematically illustrates a cross-sectional configuration taken along a line VII-VII of FIG. 5. The body mount 30 is held by a holding member 50. The holding member 50 has an opening 50A opposed to the solid-state image pickup device 40. The apparent shape 40A (see FIG. 5) of the solid-state image pickup device 40 viewed from the front surface side of the body mount 30 is defined by the opening 50A. A shutter 60 is provided between the holding member 50 and the solid-state image pickup device 40.

Figure 8:
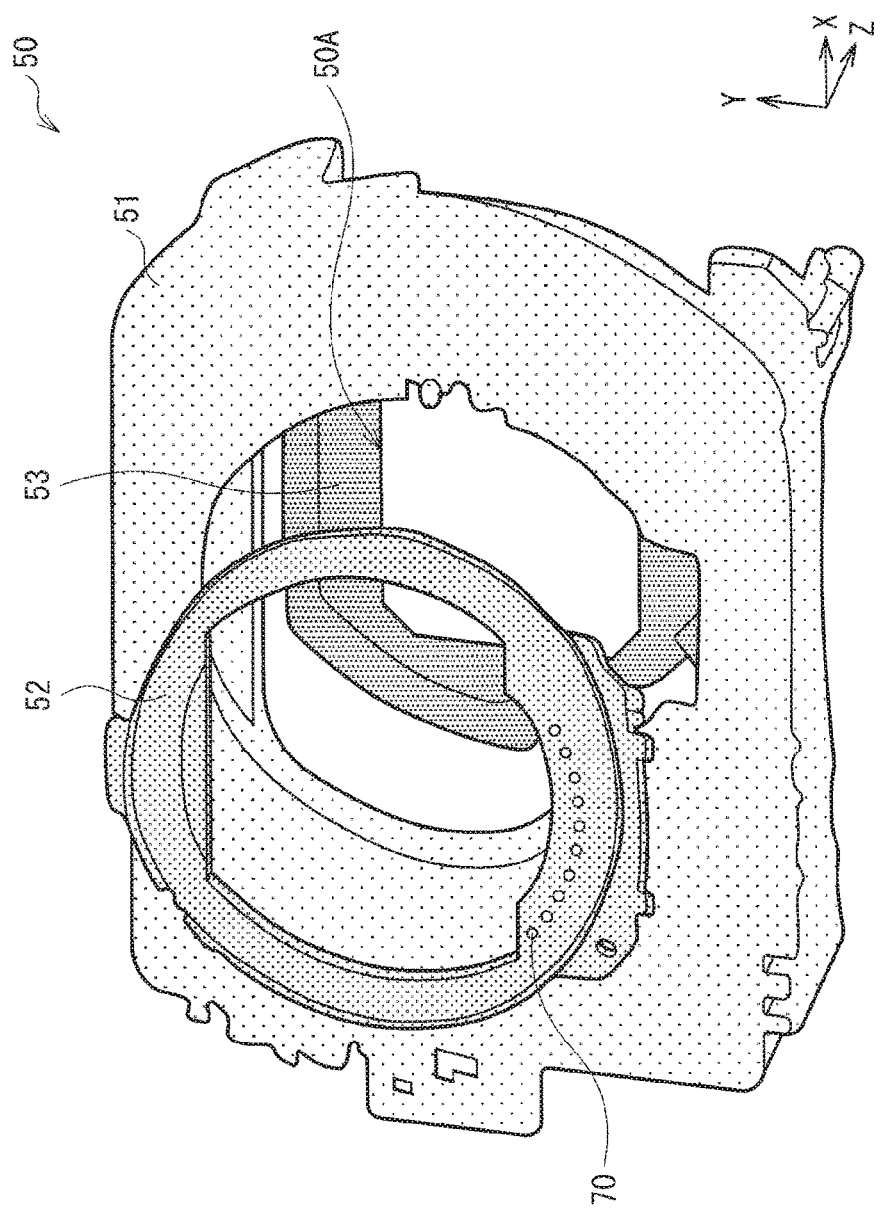
FIG. 8 is an exploded perspective view illustrating a frame, a contact pin holder, and a mask that are illustrated in FIG. 7.

More specifically, as illustrated in an exploded view of FIG. 8, the holding member 50 has a frame 51, a contact pin holder 52, and a mask 53.

The frame 51 is a hollow cylinder-like member made of a resin or a metal. The body mount 30 is attached to a forward end surface 51A.

The contact pin holder 52 is a resin part to hold contact pins 70 to electrically connect the main body 10 to the lens 3. As illustrated in FIG. 8, the contact pin holder 52 has a ring-like shape having a diameter smaller than that of the frame 51, and is fitted into the internal wall surface of the frame 51 from the forward side.

It is to be noted that since the contact pin holder 52 is provided to hold contact pins 70, it is sufficient to provide the contact pin holder 52 in part or all in the circumferential direction of the body mount 30 (in only a region around the contact pins 70). In the first embodiment, in order to adjust an appearance, as illustrated in FIG. 8, the contact pin holder 52 is provided along the entire inner circumference of the body mount 30.

The mask 53 is provided between the contact pin holder 52 and the solid-state image pickup device 40, and mainly has the following two functions. One thereof is to block unnecessary light (such as light reflected by the side surface of the contact pin holder 52) that should not enter the light receiving section 41 before such light enters the light receiving section 41. The other thereof is to let through light that should enter the light receiving section 41 without prohibiting such light from entering the light receiving section 41 as much as possible. The light that should enter the light receiving section 41 has been prescribed so that a failure does not occur based on the assumption of the forepast lenses. Since light paths vary according to the lens 3 to be attached, the shape and the like of the mask 53 may be preferably changed as appropriate according to the design of the lens 3.

The solid-state image pickup device 40 illustrated in FIG. 7 may have, for example, a semiconductor substrate 43 having the light receiving section 41 and the peripheral region 42 and a forward surface member 44 provided ahead of the semiconductor substrate 43. The forward surface member 44 may be configured of, for example, a low-pass filter suppressing moire and false color. The forward surface member 44 is fixed on the peripheral region 42 of the semiconductor substrate 43 by, for example, an adhesive layer 45. It is to be noted that the forward surface member 44 may be configured of a blank glass substrate protecting the light receiving section 41. In this case, the low-pass filter and the blank glass substrate may be used together, or the low-pass filter may be omitted.

Figure 9:
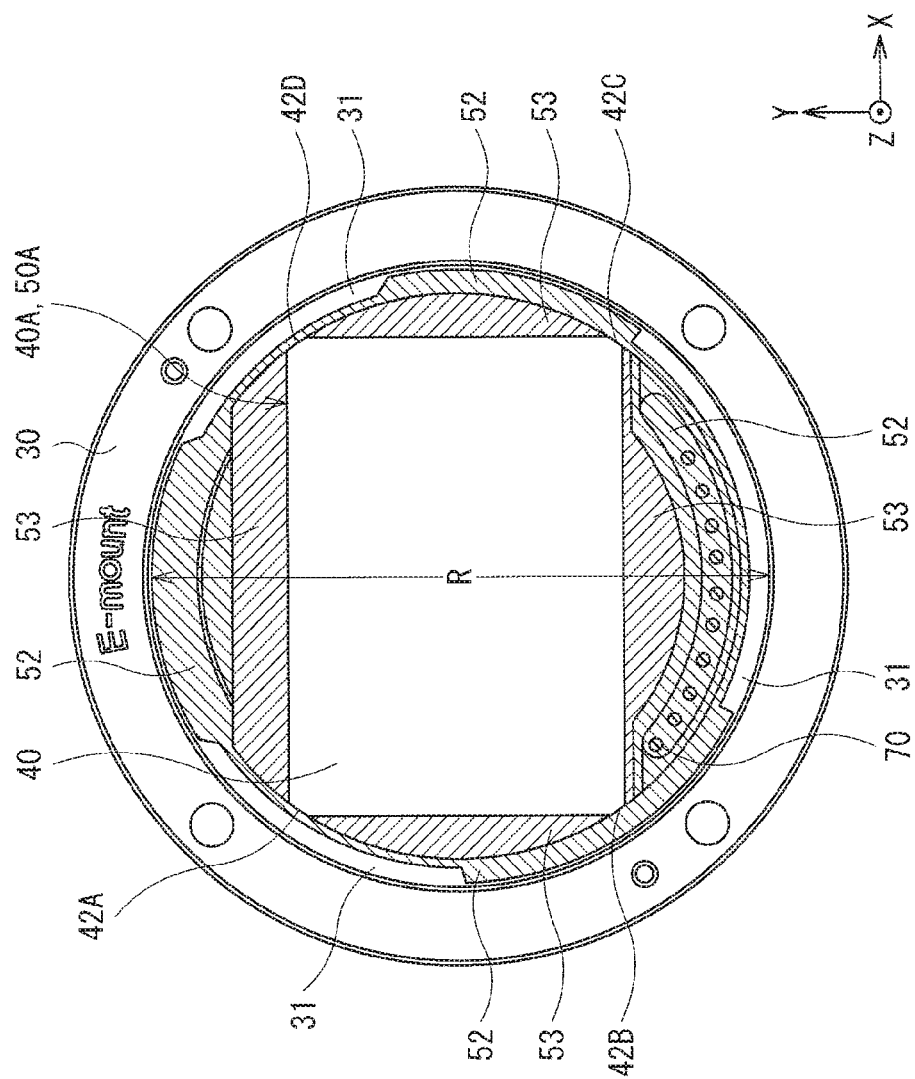
FIG. 9 is a plan view illustrating a position relation between the body mount, the contact pin holder, the mask, and the solid-state image pickup device that are illustrated in FIG. 7.

FIG. 9 illustrates a planar position relation between the body mount 30, the contact pin holder 52, the mask 53, and the solid-state image pickup device 40 that are illustrated in FIG. 7. In FIG. 9, for convenience, the contact pin holder 52 is indicated by falling diagonal strokes from top left to bottom right, and the mask 53 is indicated by falling diagonal strokes from top right to bottom left.

The body mount 30 has, as described above, a ring-like shape having the inside diameter R smaller than 48 mm. The arc-like latches 31 may be projected, for example, in three locations in the inner circumference of the body mount 30.

The contact pin holder 52 is provided in the entire circumferential direction of the body mount 30. The inner rim thereof is protruded to the inner circumference of the body mount 30. With regard to the planar shape of the contact pin holder 52, for example, the lower section thereof may be in the shape of a sector form that surrounds alignment of the contact pins 70, the upper section thereof may be a straight line along the apparent shape 40A of the solid-state image pickup device 40, and the left section and the right section may be in the shape of an arch along the inner circumference of the body mount 30.

The mask 53 is provided in the entire circumferential direction of the body mount 30. The inner rim thereof is protruded to the inner circumference of the body mount 30 and the inner circumference of the contact pin holder 52. The planar shape of the mask 53 is a rectangle, and four corners of the rectangle are oblique in the shape of an arc corresponding to the shapes of the left section and the right section of the contact pin holder 52. The opening 50A, that is, the apparent shape 40A of the solid-state image pickup device 40 is defined by the planar shape of the mask 53.

Figure 10:
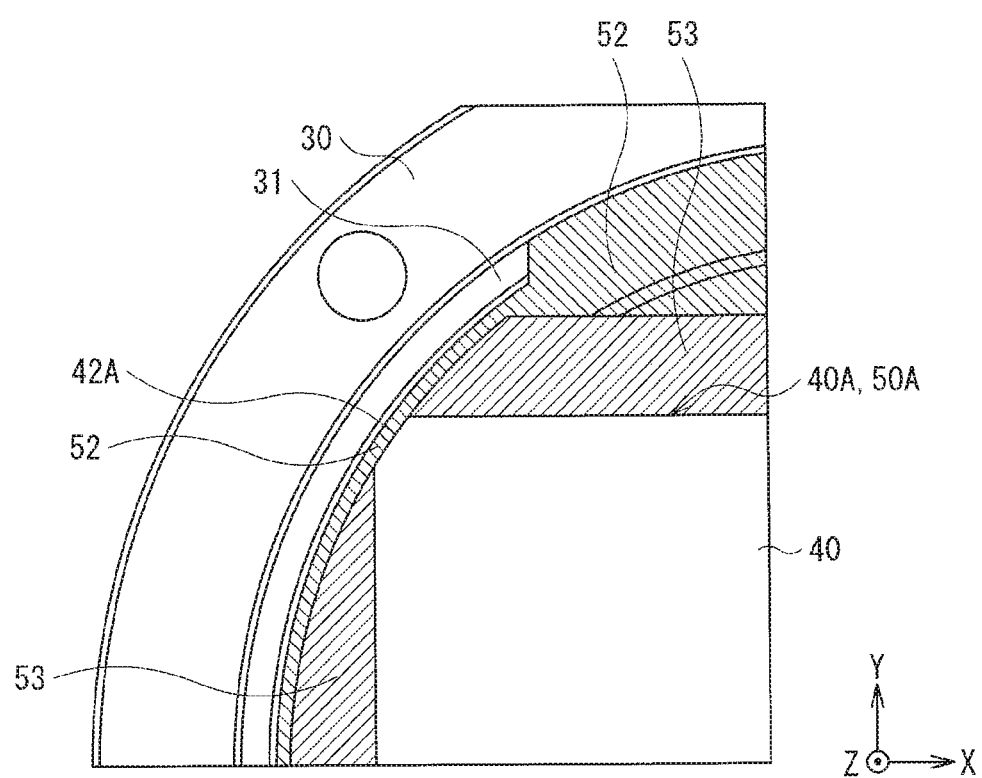
FIG. 10 is an enlarged plan view illustrating one corner of the solid-state image pickup device illustrated in FIG. 9.

As illustrated in an enlarged view of FIG. 10, the upper left corner 42A of the solid-state image pickup device 40 is oblique by the latch 31, the contact pin holder 52, and the mask 53. As illustrated in FIG. 9, the upper right corner 42D is oblique by another latch 31, the contact pin holder 52, and the mask 53. As illustrated in FIG. 9, the lower left corner 42B and the lower right corner 42C are oblique by the contact pin holder 52 and the mask 53.

Figure 11:
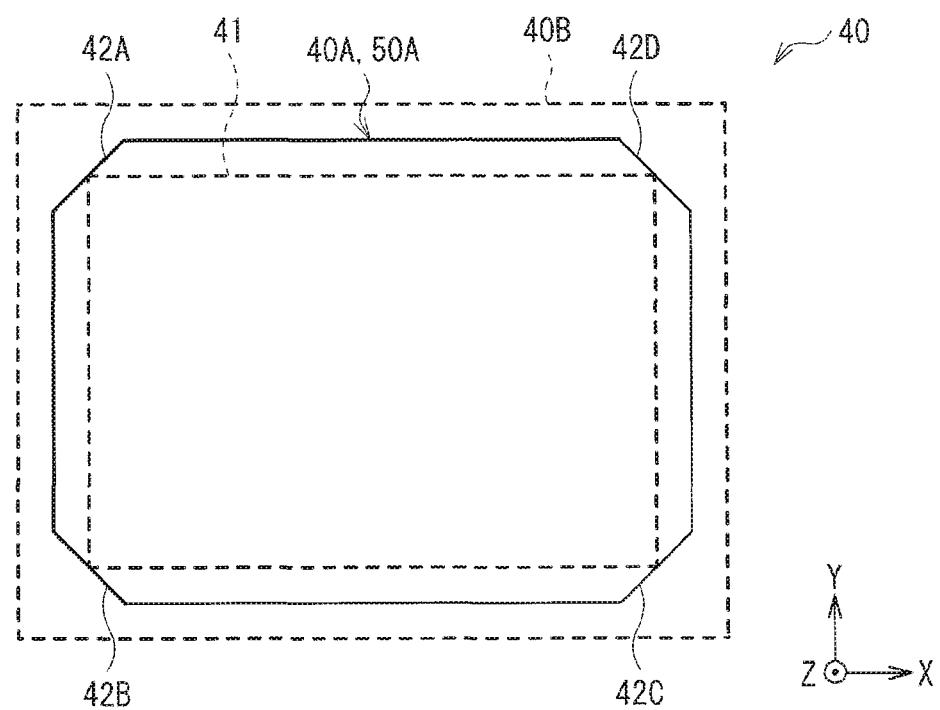
FIG. 11 is a plan view illustrating a position relation between a visible outline of the solid-state image pickup device illustrated in FIG. 9, an opening of a holding member, and a light receiving section.

FIG. 11 illustrates a planar position relation between a visible outline 40B of the solid-state image pickup device 40 illustrated in FIG. 9, the opening 50A of the holding member 50, and the light receiving section 41. The visible outline 40B of the solid-state image pickup device 40, that is, the visible outline of the semiconductor substrate 43 and the forward surface member 44 is located outside of the opening 50A. Therefore, as described above, the apparent outer shape 40A of the solid-state image pickup device 40 becomes a rectangle in which the four corners 42A, 42B, 42C, and 42D are oblique.

Further, the opening 50A may be preferably located outside of the light receiving section 41. One reason for this is that, in the case where the contact pin holder 52 and the mask 53 are overlapped with the light receiving section 41, the light that should enter the light receiving section 41 might be blocked.

In the camera 2, a subject image formed by the optical system (not illustrated) of the lens 3 is picked up by the light receiving section 41 of the solid-state image pickup device 40. Picked-up data is displayed on the monitor 17, and is recorded in a memory (not illustrated). In this case, since the solid-state image pickup device 40 having the diagonal line length L of the light receiving section 41 equal to or more than 43 mm is mounted on the body mount 30 having the inside diameter R smaller than 48 mm, an advantage due to increasing the size of the solid-state image pickup device 40 is allowed to be obtained. Specifically, the depth of field becomes smaller, and therefore, a subject is shot sharply while background becomes easily blurry.

As described above, in the first embodiment, the large-sized solid-state image pickup device 40 having the diagonal line length L of the light receiving section 41 equal to or more than 43 mm is mounted on the body mount 30 having the inside diameter R smaller than 48 mm, and the apparent shape 40A of the solid-state image pickup device 40 viewed from the front surface side of the body mount 30 is a rectangle in which one or more corners are oblique. Therefore, while the size of the camera is small, high image quality is obtainable.

Second Embodiment

Figure 12:
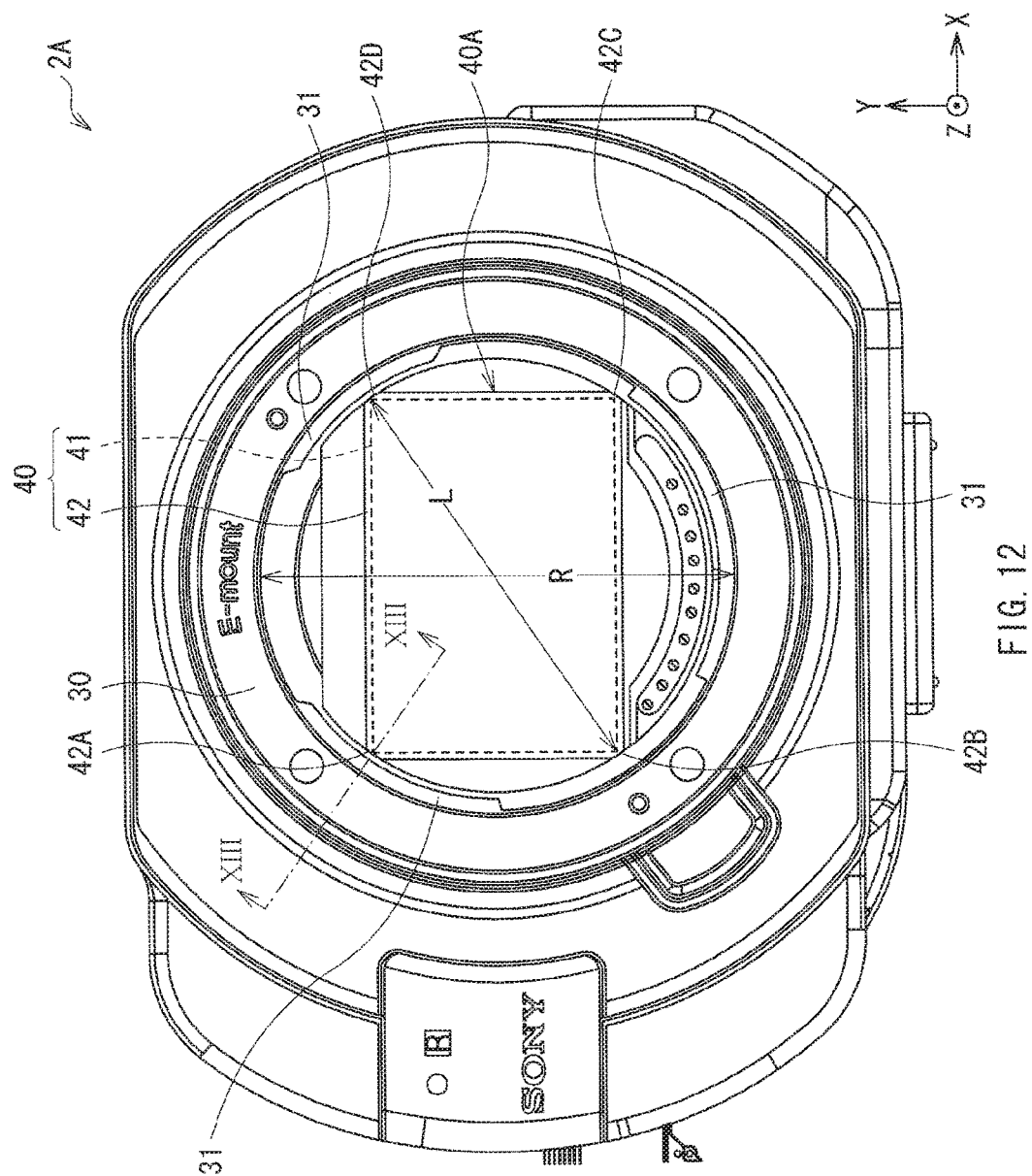
FIG. 12 is an elevation view of a mount of a camera according to a second embodiment of the present disclosure, which is viewed from the forward side.
Figure 13:
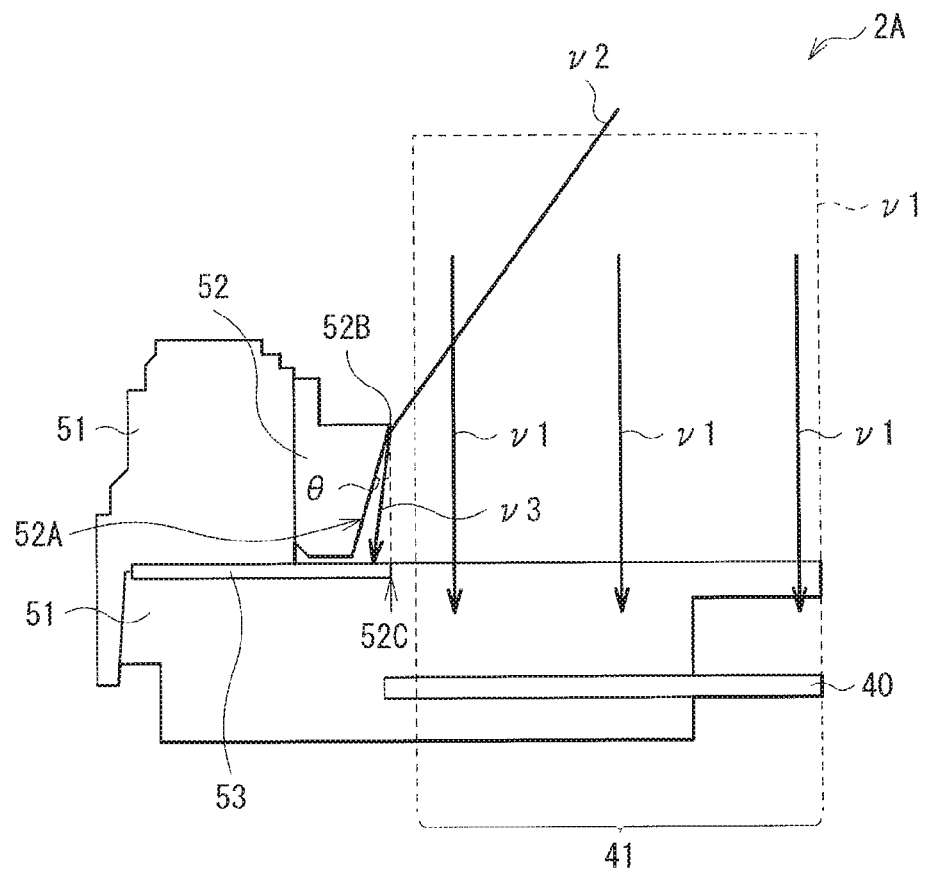
FIG. 13 is a schematic cross-sectional view taken along a line XIII-XIII of FIG. 12.

FIG. 12 illustrates a configuration of the body mount 30 in a camera 2A according to a second embodiment of the present disclosure, which is viewed from the forward side. FIG. 13 schematically illustrates a cross-sectional configuration taken along a line XIII-XIII of FIG. 12. In the camera 2A, unnecessary light is prevented from entering the light receiving section 41 by tilting an internal wall surface 52A of the contact pin holder 52. Except for this point, the camera 2A has a configuration, a function, and an effect similar to those of the foregoing first embodiment. Therefore, for corresponding elements thereof, descriptions will be given by affixing the same referential symbols thereto.

In the oblique four corners 42A, 42B, 42C, and 42D of the apparent shape 40A of the solid-state image pickup device 40, the internal wall surface 52A of the contact pin holder 52 is tilted so that the inside diameter becomes wider as the location of the internal wall surface 52A becomes closer to the solid-state image pickup device 40. Although FIG. 13 illustrates a cross section in the corner 42A, the other corners 42B to 42D are similarly configured.

The mask 53 may preferably let through normal light v1 (light that should enter the light receiving section 41), and may preferably block reflected light v3 obtained by reflecting outside-normal light v2 (light having the maximum angle of a forepast lens) in the vicinity of an edge 52B of the internal wall surface 52A. To that end, as illustrated in FIG. 13, the mask 53 may be preferably extended toward position 52C directly under the edge 52B of the internal wall surface 52A of the contact pin holder 52.

Inclination angle θ of the internal wall surface 52A may be preferably adjusted in consideration of incident angle of the outside-normal light v2 and lowering of intensity due to reduced thickness of the contact pin holder 52.

In the four corners 42A to 42D of the apparent shape 40A of the solid-state image pickup device 40, the inclination angle θ of the internal wall surface 52A may be, for example, preferably identical.

In the camera 2A, a subject image is picked up as in the foregoing first embodiment. In this case, in the oblique four corners 42A, 42B, 42C, and 42D of the apparent shape 40A of the solid-state image pickup device 40, the internal wall surface 52A of the contact pin holder 52 is tilted so that the inside diameter becomes wider as the location of the internal wall surface 52A becomes closer to the solid-state image pickup device 40. Therefore, while the normal light v1 enters the light receiving section 41, the outside-normal light v2 is reflected by the edge 52B of the internal wall surface 52A of the contact pin holder 52, and the reflected light v3 thereof is blocked by the mask 53 before entering the light receiving section 41.

Figure 14:
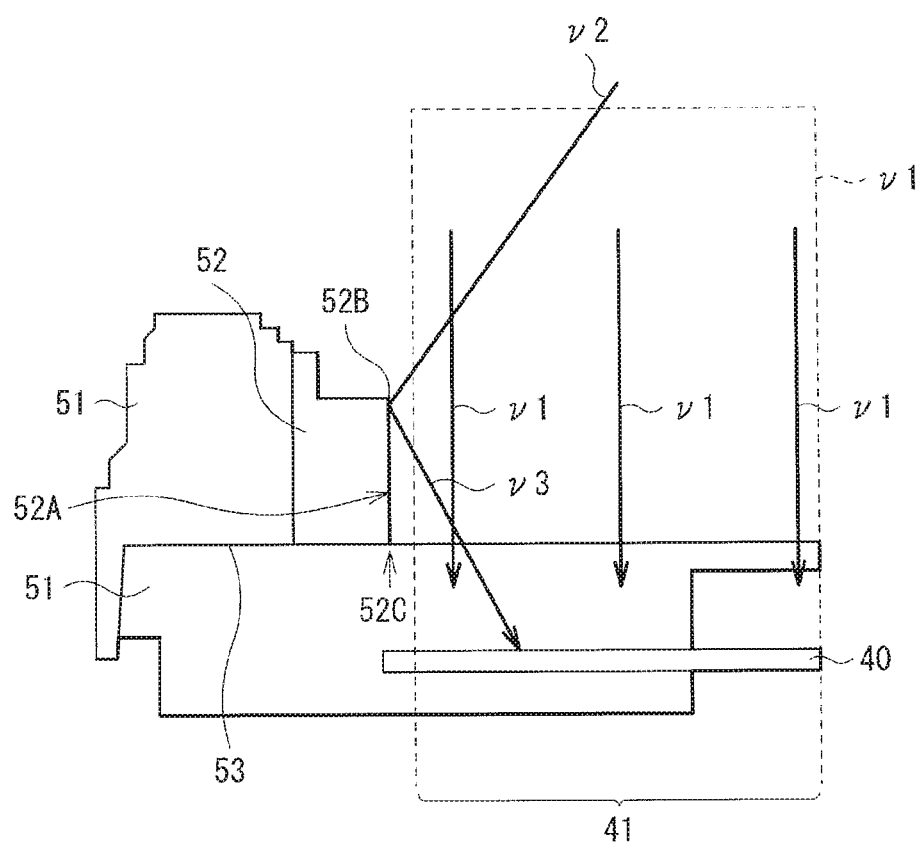
FIG. 14 is a schematic cross-sectional view illustrating a case in which an internal wall surface of a contact pin holder is an upstanding surface.

On the other hand, as illustrated in FIG. 14, in the case where the internal wall surface 52A of the contact pin holder 52 is an upstanding surface, and the mask 53 is omitted, there is a possibility that the outside-normal light v2 is reflected by the edge 52B of the internal wall surface 52A of the contact pin holder 52, and reflected light v4 thereof enters the light receiving section 41.

As described above, in the second embodiment, in the oblique four corners 42A, 42B, 42C, and 42D of the apparent shape 40A of the solid-state image pickup device 40, the internal wall surface 52A of the contact pin holder 52 is tilted so that the inside diameter becomes wider as the location of the internal wall surface 52A becomes closer to the solid-state image pickup device 40. Therefore, unnecessary light is allowed to be prevented from entering the light receiving section 41, and further, high image quality is obtainable.

It is to be noted that the internal wall surface 52A of the contact pin holder 52 may be tilted in sections other than the foregoing four corners 42A to 42D, in addition to the oblique four corners 42A, 42B, 42C, and 42D of the apparent shape 40A of the solid-state image pickup device 40.

In the first embodiment, in order to keep influence on image quality to the minimum, and to mount the solid-state image pickup device 40 sized as large as possible on the body mount 30 having an inside diameter sized as small as possible, one or more corners of the apparent shape 40A of the solid-state image pickup device 40 are oblique. In the second embodiment, in order to reduce influence on image quality occurring in the first embodiment, the internal wall surface 52A is tilted so that the inside diameter becomes wider as the location of the internal wall surface 52A becomes closer to the solid-state image pickup device 40.

The present disclosure has been described with reference to the preferred embodiments. However, the present disclosure is not limited to the foregoing embodiments, and various modifications may be made.

Figure 15:
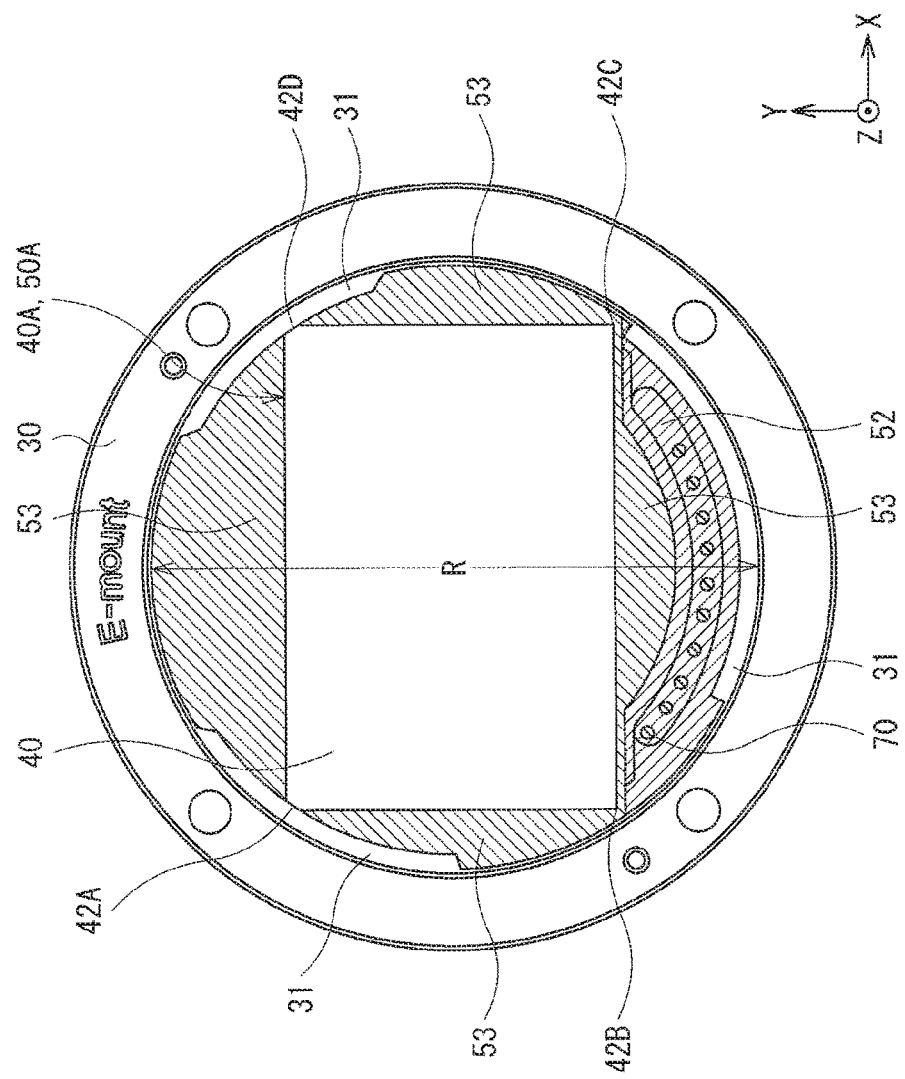
FIG. 15 is an elevation view illustrating a modification of FIG. 7.

For example, in the foregoing embodiments, the description has been given of the case in which the apparent shape 40A of the solid-state image pickup device 40 viewed from the front surface side of the body mount 30 is a rectangle in which the four corners 42A, 42B, 42C, and 42D are oblique as illustrated in FIG. 5. However, the apparent shape 40A of the solid-state image pickup device 40 viewed from the front surface side of the body mount 30 may be, for example, as illustrated in FIG. 15, a rectangle in which the two corners 42A and 42D are oblique. It is to be noted that, in the example illustrated in FIG. 15, the contact pin holder 52 is provided only in the peripheral region of the contact pins 70, and the planar shape of the mask 53, that is, the shape of the opening 50A is a rectangle, and therefore, only the two corners 42A and 42D are oblique by the latches 31.

Further, only one of the four corners 42A to 42D may be oblique by the latch 31 by changing arrangement of the latches 31 in the example illustrated in FIG. 15. Similarly, three of the four corners 42A to 42D may be oblique by the latches 31.

In addition thereto, for example, the shape, the dimensions, the material, the manufacturing method, and the like of each component are not limited to those described in the foregoing embodiments, and other shapes, other dimensions, other materials, and other manufacturing methods may be used.

Further, for example, in the foregoing embodiments, the description has been given of the configurations of the optical apparatus 1 and the camera 2 with the specific examples. However, all components are not necessarily included, and other components may be further included.

Further, in the foregoing embodiments, as an example of the solid-state image pickup device 40, the description has been given of the 35 mm full-frame solid-state image pickup device. However, the present disclosure is effective for a case in which the solid-state image pickup device 40 sized larger than the 35 mm full-frame solid-state image pickup device may be mounted on the body mount 30 having the inside diameter smaller than 48 mm.

The present disclosure is applicable not only to the camcorder capable of shooting both moving images and still images that has been described in the foregoing embodiments, but also widely to cameras with interchangeable lenses and optical apparatuses including a camera capable of shooting only still images.

It is to be noted that the present technology may be configured as follows.

(1) A camera, including:
a ring-like body mount having an inside diameter smaller than about 48 millimeters; and
a solid-state image pickup device arranged oppositely to the body mount, the solid-state image pickup device having a rectangle light receiving section with a diagonal line length of about 43 millimeters or more, wherein
an apparent shape of the solid-state image pickup device viewed from a front surface side of the body mount is a rectangle in which one or more corners are oblique.

(2) The camera according to (1), wherein the light receiving section is in the shape of a rectangle having a long side of about 36 millimeters and a short side of about 24 millimeters.

(3) The camera according to (1) or (2), wherein the apparent shape of the solid-state image pickup device is a rectangle in which four corners are oblique.

(4) The camera according to any one of (1) to (3), further including an arc-like latch, the latch being projected in an inner circumference of the body mount, wherein
one or more corners of the solid-state image pickup device are hidden by the latch when viewed from the front surface side of the body mount.

(5) The camera according to any one of (1) to (4), further including a holding member, the holding member holding the body mount and the solid-state image pickup device, the holding member having an opening opposed to the solid-state image pickup device, wherein
the apparent shape of the solid-state image pickup device is defined by the opening.

(6) The camera according to (5), wherein the opening is located outside of the light receiving section.

(7) The camera according to (5) or (6), wherein the holding member includes
a hollow cylinder-like frame to which the body mount is attached, and
a contact pin holder being provided in part or all of an internal wall surface of the frame.

(8) The camera according to (7), wherein an internal wall surface of the contact pin holder is tilted to allow an inside diameter to become wider as a location of the internal wall surface of the contact pin holder becomes closer to the solid-state image pickup device at least in the oblique corner of the apparent shape of the solid-state image pickup device.

(9) The camera according to (7) or (8), wherein the holding member further includes a mask between the contact pin holder and the solid-state image pickup device, the mask blocking unnecessary light.

(10) The camera according to any one of (1) to (9), wherein the solid-state image pickup device is a full-frame pickup device.

(11) An optical apparatus provided with a camera and a lens joined interchangeably to the camera, the camera including:
a ring-like body mount having an inside diameter smaller than about 48 millimeters; and
a solid-state image pickup device arranged oppositely to the body mount, the solid-state image pickup device having a rectangle light receiving section with a diagonal line length of about 43 millimeters or more, wherein
an apparent shape of the solid-state image pickup device viewed from a front surface side of the body mount is a rectangle in which one or more corners are oblique.

It should be understood by those skilled in the art that various modifications, combinations, sub-combinations, and alternations may occur depending on design requirements and other factors insofar as they are within the scope of the appended claims or the equivalents thereof.

What is claimed is:

1. An interchangeable lens being attachable to a camera body, the interchangeable lens comprising:
a ring-like lens mount that is attachable to a ring-like body mount of the camera body, the ring-like lens mount is configured to engage with a corresponding one or more of a plurality of body-side latches of the ring-like body mount, and
an optical system configured to form a subject image on a light receiving section of a solid-state image pickup device of the camera body,
wherein the interchangeable lens is configured to electrically connect to a plurality of body-side contact pins located around the solid-state image pickup device and between the ring-like body mount and the solid-state image pickup device, and
wherein the ring-like body mount defines an aperture with at least one spatial dimension that is a smaller than a corresponding at least one spatial dimension of the solid-state image pickup device, and
wherein one or more portions of the ring-like body mount are configured to obscure a corresponding one or more portions of the solid state image pickup device.

2. The interchangeable lens according to claim 1, wherein the at least one spatial dimension of the ring-like body mount is an inside diameter of the ring-like body mount, and wherein the corresponding at least one spatial dimension of the solid-state image pickup device is a diagonal length of the solid-state image pickup device.

3. The interchangeable lens according to claim 2, wherein the inside diameter of the ring-like body mount is smaller than approximately 43 millimeters, and wherein the diagonal length of the solid-state image pickup device is approximately 43 millimeters or greater.

4. The interchangeable lens according to claim 1, wherein the ring-like lens mount is made of a metal.

5. The interchangeable lens according to claim 1, further comprising an adapter configured to attach the interchangeable lens to the camera body.

6. The interchangeable lens according to claim 1, wherein the light receiving section has a rectangular shape with a long side of about 36 millimeters and a short side of about 24 millimeters.

7. The interchangeable lens according to claim 2, further comprising a holding member configured to hold the ring-like body mount to a shutter, the shutter being attached to the solid-state image pickup device.

8. The interchangeable lens according to claim 7, wherein the holding member further includes
a hollow cylinder-like frame that is configured to attach to the ring-like body mount, and
a contact pin holder being provided in part or all of an internal wall surface of the hollow cylinder-like frame.

9. The interchangeable lens according to claim 8, wherein the internal wall surface of the contact pin holder is tilted to allow the inside diameter to become wider as a location of the internal wall surface of the contact pin holder becomes closer to the ring-like body mount.

10. The interchangeable lens according to claim 8, wherein the holding member further includes a mask that is configured to block unnecessary light between the contact pin holder and the light receiving section.

11. An interchangeable lens being attachable to a camera body, the interchangeable lens comprising:
a ring-like lens mount that is attachable to a ring-like body mount of the camera body, the ring-like lens mount is configured to engage with a corresponding one or more of a plurality of body-side latches of the ring-like body mount, and
an optical system configured to form a subject image on a light receiving section of a solid-state image pickup device of the camera body,
wherein the interchangeable lens is configured to electrically connect to a plurality of body-side contact pins located around the solid-state image pickup device and between the ring-like body mount and the solid-state image pickup device,
wherein the ring-like body mount defines an aperture with at least one spatial dimension that is a smaller than a corresponding at least one spatial dimension of the solid-state image pickup device, and
wherein one or more portions of the ring-like body mount are configured to obscure a corresponding one or more portions of the light receiving section.

12. The interchangeable lens according to claim 11, wherein the light receiving section is rectangular, and wherein the corresponding one or more portions are one or more corners of the light receiving section.

13. The interchangeable lens according to claim 11, further comprising a latch that obscures the one or more portions of the light receiving section.

14. The interchangeable lens according to claim 13, further comprising a contact pin holder that obscures the one or more portions of the light receiving section, wherein one of the latch and the contact pin holder extends further toward an optical axis of the optical system than the other.

15. The interchangeable lens according to claim 1, wherein the at least one spatial dimension of the ring-like body mount is a diagonal length, and wherein the diagonal length of the ring-like lens mount is smaller than a corresponding diagonal length of the light receiving section.

16. A system comprising:
a solid-state image pickup device including a light receiving section configured to pick up a subject image;
a ring-like body mount of a camera body including a plurality of body-side latches, the ring-like body mount defining an aperture with at least one spatial dimension that is smaller than a corresponding at least one spatial dimension of the solid-state image pickup device;
a plurality of body-side contact pins; and
an interchangeable lens including
a ring-like lens mount that is attachable to the ring-like body mount and configured to engage with a corresponding one or more of the plurality of body-side latches,
an optical system configured to form the subject image on the light receiving section,
wherein the interchangeable lens is configured to electrically connect to the plurality of body-side contact pins, and
wherein one or more portions of the ring-like lens mount are configured to obscure a corresponding one or more portions of the solid-state image pickup device.

17. The system according to claim 16, wherein the corresponding one or more portions of the solid-state image pickup device is a corresponding one or more portions of the light receiving section.

18. The system according to claim 16, wherein the light receiving section is rectangular, and wherein the corresponding one or more portions are one or more corners.

19. The system according to claim 16, further comprising a latch that obscures the corresponding one or more portions of the solid-state image pickup device.

20. The system according to claim 19, further comprising a contact pin holder that obscures the corresponding one or more portions of the solid-state image pickup device, wherein one of the latch and the contact pin holder extends further toward an optical axis of the optical system than the other.

21. The system according to claim 16, wherein the plurality of body-side contact pins is located proximally to the aperture that is defined by the ring-like body mount.

22. The system according to claim 16, wherein the at least one spatial dimension of the aperture is a diagonal length, and wherein the corresponding at least one spatial dimension of the solid-state image pickup device is a corresponding diagonal length of the solid-state image pickup device.

23. The system according to claim 16, wherein at least one spatial dimension of the ring-like lens mount is a smaller than a second corresponding at least one spatial dimension of the ring-like body mount.

* * * * *